United States Patent [19]

Saitou

[11] Patent Number: 4,651,250

[45] Date of Patent: Mar. 17, 1987

[54] OPERATING LEVER APPARATUS

[75] Inventor: Sinichi Saitou, Tokyo, Japan

[73] Assignee: Olympus Optical Ltd., Tokyo, Japan

[21] Appl. No.: 662,550

[22] Filed: Oct. 19, 1984

Related U.S. Application Data

[63] Continuation of Ser. No. 382,208, May 26, 1982, abandoned.

[30] Foreign Application Priority Data

May 28, 1981 [JP] Japan .................................. 56-81720

[51] Int. Cl.$^4$ ...................... G11B 5/008; G11B 15/00; G11B 17/00
[52] U.S. Cl. .................................. 360/137; 360/96.4; 74/483 PB
[58] Field of Search ............... 360/137, 90, 93, 60–62, 360/69, 96.3, 96.4; 242/198; 74/483 PB; 70/240; 292/DIG. 14

[56] References Cited

U.S. PATENT DOCUMENTS

| | | | |
|---|---|---|---|
| 2,877,035 | 3/1959 | Claud-Mantle | 292/DIG. 14 |
| 3,947,895 | 3/1976 | Suzuki | 360/137 |
| 3,966,244 | 6/1976 | Kleisser et al. | 70/240 X |
| 3,972,070 | 7/1976 | Fukayama | 360/74.4 |
| 4,037,262 | 7/1977 | Kobayashi et al. | 360/96 |
| 4,081,849 | 3/1978 | Onishi | 74/483 PB |
| 4,149,203 | 4/1979 | Kobayashi et al. | 360/60 |
| 4,172,266 | 10/1979 | Onishi | 360/137 |
| 4,179,721 | 12/1979 | Nakazono | 360/137 |
| 4,330,801 | 5/1982 | Morinaga | 360/69 |
| 4,380,031 | 4/1983 | d'Alayes de Costemore d'Arc | 360/74.1 |

Primary Examiner—A. J. Heinz
Assistant Examiner—David J. Severin
Attorney, Agent, or Firm—Frishauf, Holtz, Goodman & Woodward

[57] ABSTRACT

An operating lever apparatus used in an electric appliance to operate in accordance with electric signals produced by signal generator, comprises a first base plate, a second base plate disposed parallel to the first base plate at a given distance therefrom, an operating lever disposed between the first and second base plates so as to be able to move along the same between first and second positions, whereby the signal generator is caused to produce an electric signal when the operating lever is located in the second position, holding member for holding the operating lever in a position just before the second position, and a driving member disposed so as to be able to move along the first and second base plates between first and second positions in a direction to intersect the moving direction of the operating lever, and having a guide bore for guiding the operating lever in movement from the first position to the position just before the second position when the driving member is located in the first position, the driving member moving in the direction to intersect the moving direction of the operating lever to shift the operating lever from the position just before the second position to the second position when the operating lever is located in the position just before the second position.

38 Claims, 7 Drawing Figures

F I G. 3
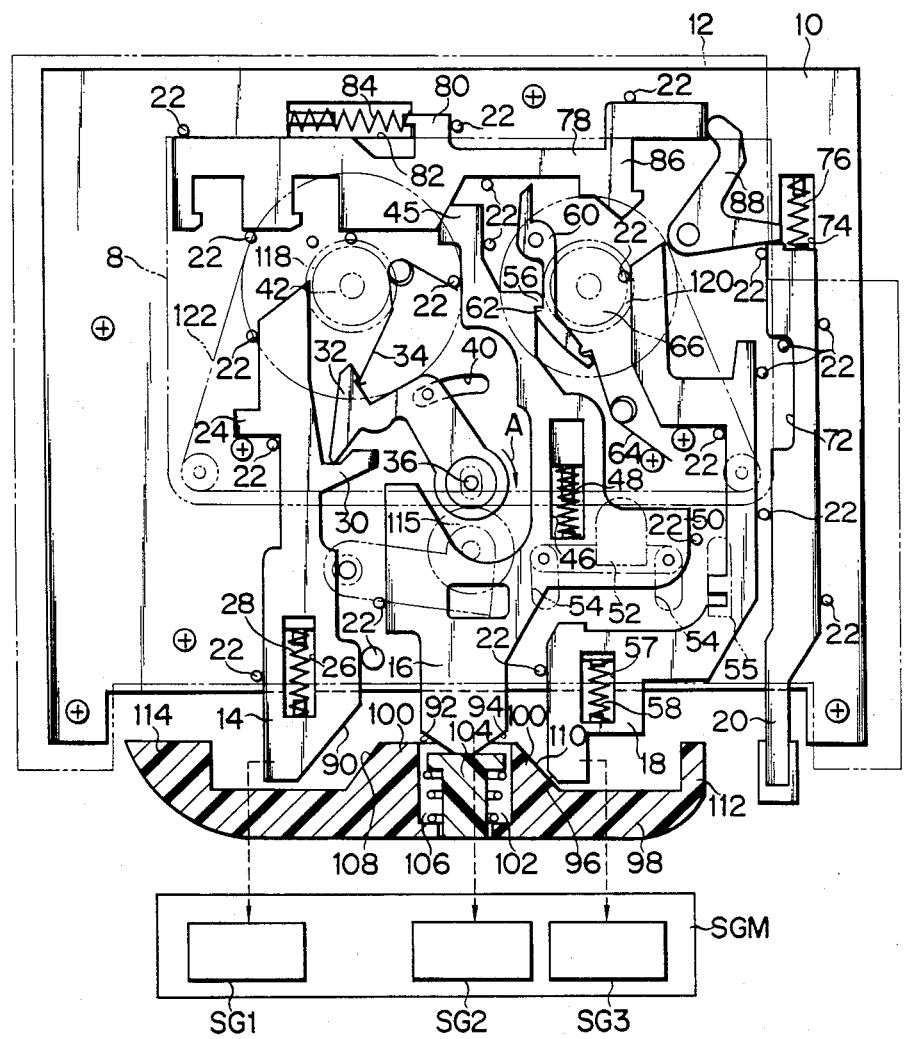

F I G. 7
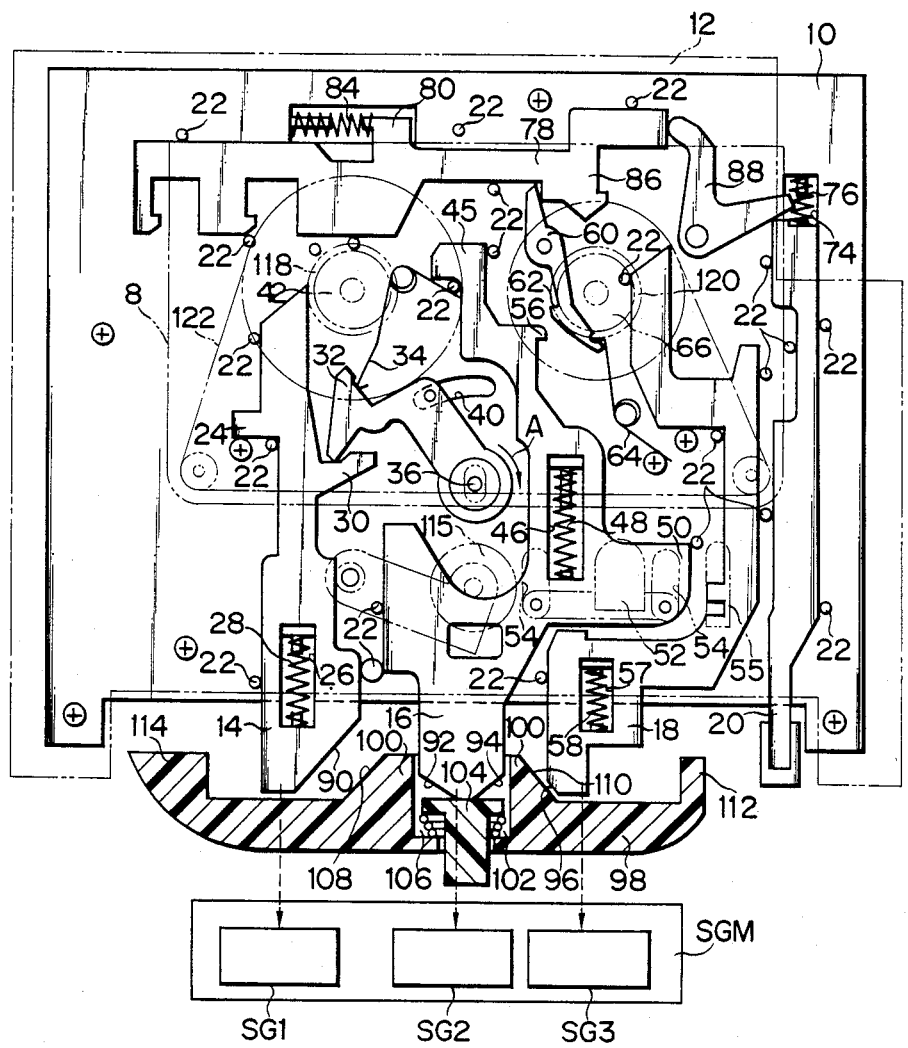

OPERATING LEVER APPARATUS

This application is a continuation of application Ser. No. 382,208, filed May 26, 1982, now abandoned.

BACKGROUND OF THE INVENTION

This invention relates to an operating lever apparatus which is used in an electric appliance to perform various operations in accordance with various electric signals produced by signal generating means, and which drives the signal generating means to produce the electric signals.

In a prior art operating lever apparatus, a force is applied directly to an operating lever along its moving direction to shift it from a first position to a second position along a base plate, where the operating lever causes signal generating means to produce an electric signal. In another prior art operating lever apparatus, an operating lever is shifted from its first position to the second position by moving a driving member in a direction to intersect the moving direction of the operating lever and the base plate, and signal generating means is driven to produce an electric signal when the operating lever is located in its second position.

In the conventional operating apparatus of such construction, it requires relatively much time for the operating lever to be shifted from its first position to the second. This means that the time required for the start of a prescribed operation of the electric apparatus is comparatively long. Such a situation may lead to a disadvantage to some electric apparatus, including, e.g., tape recorders. When recording a sound, such as a speech, by using a tape recorder provided with the prior art operating lever apparatus, if production of the sound or speech is started without notice, the opening part of the speech will fail to be recorded because it will have already been delivered before the start of recording operation. It will therefore be impossible to record the entire speech.

Moreover, in the aforesaid prior art operating apparatus, the operating lever may be depressed or the driving member may be shifted by mistake. Pocketsize tape recorders using the so-called micro cassettes, for example, are liable to fall into such an awkward situation while they are being carried in a pocket or in a bag. Such trouble will result in an unnecessary waste of battery power.

SUMMARY OF THE INVENTION

This invention is designed in consideration of these circumstances, and is intended to provide an operating lever apparatus free from mistaken shifting of operating levers and capable of reducing the time required for the start of prescribed operations of electric appliances without waste of electric power.

The above object of the invention may be attained by an operating lever apparatus used in an electric appliance to operate in accordance with electric signals produced by signal generating means, which comprises a first base plate, a second base plate disposed parallel to the first base plate at a given distance therefrom, an operating lever disposed between the first and second base plates so as to be able to move along the first and second base plates between first and second positions, whereby the signal generating means is caused to produce an electric signal when the operating lever is located in the second position, holding means for holding the operating lever in a position just before the second position, and a driving member disposed so as to be able to move along the first and second base plates between first and second positions in a direction to intersect the moving direction of the operating lever, and having guide means for guiding the operating lever in movement from the first position to the position just before the second position when the driving member is located in the first position, the driving member moving in the direction to intersect the moving direction of the operating lever to shift the operating lever from the position just before the second position to the second position when the operating lever is located in the position just before the second position.

In locating the operating lever in its second position in such an arrangement, it is necessary that the operating lever be shifted from the position just before the second position to the second position by means of the driving member which moves along the direction to intersect the direction of movement of the operating lever from the first position to the second position, after the operating lever is moved from the first position to the position just before the second position by the guide means. Thus, the operating lever will never be located in its second position by mistake during the carrying of the electric appliance with the operating lever apparatus of the invention, so that there will be no waste of electric power. Further, the time required for the start of prescribed operation of the electric appliance can be reduced by locating the operating lever in the position just before the second position by the use of the holding means.

Preferably, in the operating lever apparatus of the invention, the driving means has a guide bore extending along the direction of the movement of the operating lever between the first and second positions. Furthermore, the operating lever should have urging means for urging the operating lever to be located in the first position and should have one end portion which, extending along the direction of the movement of the operating lever between the first and second positions, is inserted in the guide bore of the driving member when the driving member is located in the first position. The one end portion preferably has a slant face at the intersectional region between the end face of the one end portion and a side face extending along the moving direction of the operating lever to intersect the moving direction of the driving member, the slant face facing one end edge of the guide bore of the driving member when the operating lever is located in the position just before the second position. As a result, when the operating lever is located in the position just before the second position, the driving member is moved from the first position to the second position thereof to bring the slant face of the operating lever into slide contact with the one end edge of the guide bore of the driving member, thereby shifting the operating lever from the position just before the second position to the second position thereof.

With such an arrangement, the operating lever apparatus can be simplified in construction for improved compactness.

Preferably, the operating lever apparatus of the invention further comprises a push-button member disposed in the guide bore so as to be able to move along the moving direction of the operating lever. Moreover, it should have one end capable of coming into contact with the end face of the one end portion of the operating lever when the operating lever is located in the first position, and the other end projected from the driving member into the outside space when the operating lever is located in the first position.

With such an arrangement, it is possible to check to see, from the position of the push-button member, if the operating lever is in the position just before the second position, that is, if the electric appliance using the operating lever apparatus is on stand-by.

Preferably, the operating lever apparatus of the invention further comprises urging means disposed in the guide bore, whereby the one end of the push-button member is pressed against the end face of the one end portion of the operating lever in the first position with a force smaller than the urging force of the urging means of the operating lever to urge the operating lever to be moved toward the second position.

With such an arrangement, the operating lever apparatus of the invention can be operated with high reliability without regard to the posture of the electric appliance using the operating lever apparatus.

Preferably, the operating lever apparatus of the invention further comprises another operating lever disposed between the first and second base plates so as to be able to move along the first and second base plates between first and second positions, whereby the signal generating means is caused to produce an electric signal separate from the aforesaid signal when the additional operating lever is located in the second position. In the operating lever apparatus, the driving member should be able to move to a third position as well as to the first and second positions, and should include auxiliary driving means for shifting the additional operating lever from the first position to the second position thereof as the driving member moves to the third position thereof.

With such an arrangement, even a plurality of operating levers can be operated by means of a single driving member.

Moreover, in the operating lever apparatus of the invention, it is preferable that the moving direction of the additional operating lever be substantially parallel to the moving direction of the first operating lever and the additional operating lever have one end portion located in the vicinity of the driving member. Furthermore, the auxiliary driving means of the driving member should have a slant face formed on the driving member and facing the one end portion of the additional operating lever in the first position thereof as the driving member is located in the first or second position thereof. Thus, the slant face may be brought into slide contact with the one end portion of the additional operating lever to shift the additional operating lever from the first position to the second position thereof as the driving member moves to the third position thereof.

With such an arrangement, the operating lever apparatus can be simplified in construction for improved compactness despite the use of the plurality of operating levers.

Furthermore, the operating lever apparatus of the invention preferably comprises urging means for urging the additional operating lever to be located in the first position thereof.

With such an arrangement, the additional operating lever can be operated with high reliability without regard to the posture of the electric appliance using the operating lever apparatus of the invention.

BRIEF DESCRIPTION OF THE DRAWINGS

FIG. 3 is a plan view showing a state in which a pair of reel shafts of the operating lever apparatus of FIG. 2 are fitted with a pair of reel hubs of a tape cassette, and in which the second operating lever as an operating lever of the invention is located in a stand-by position just before its second position;

FIG. 7 is a plan view showing a state in which the pair of reel shafts of the operating lever apparatus of FIG. 2 are fitted with the pair of reel hubs of the tape cassette, and in which the fourth operating lever to function as a stop lever is located in its second position.

A preferred embodiment of this invention will now be described with reference to the accompanying drawings.

DETAILED DESCRIPTION OF THE PREFERRED EMBODIMENT

Figure 1:
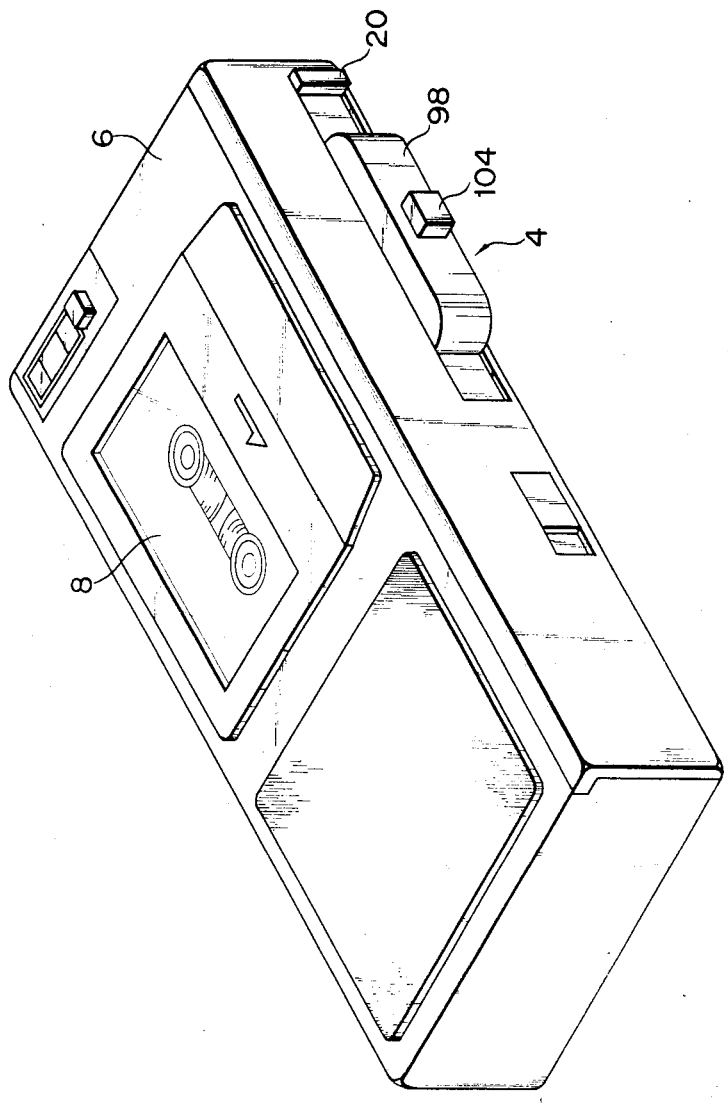
FIG. 1 is a perspective view of a tape recorder as an electric appliance provided with an operating lever apparatus according to an embodiment of this invention.

FIG. 1 shows an electric appliance 6 which is provided with an operating lever apparatus 4 according to an embodiment of this invention. In this embodiment, the electric appliance 6 is a tape recorder using what is called a micro cassette 8, one of the selling points of which lies in compact design or miniaturization.

Figure 2:
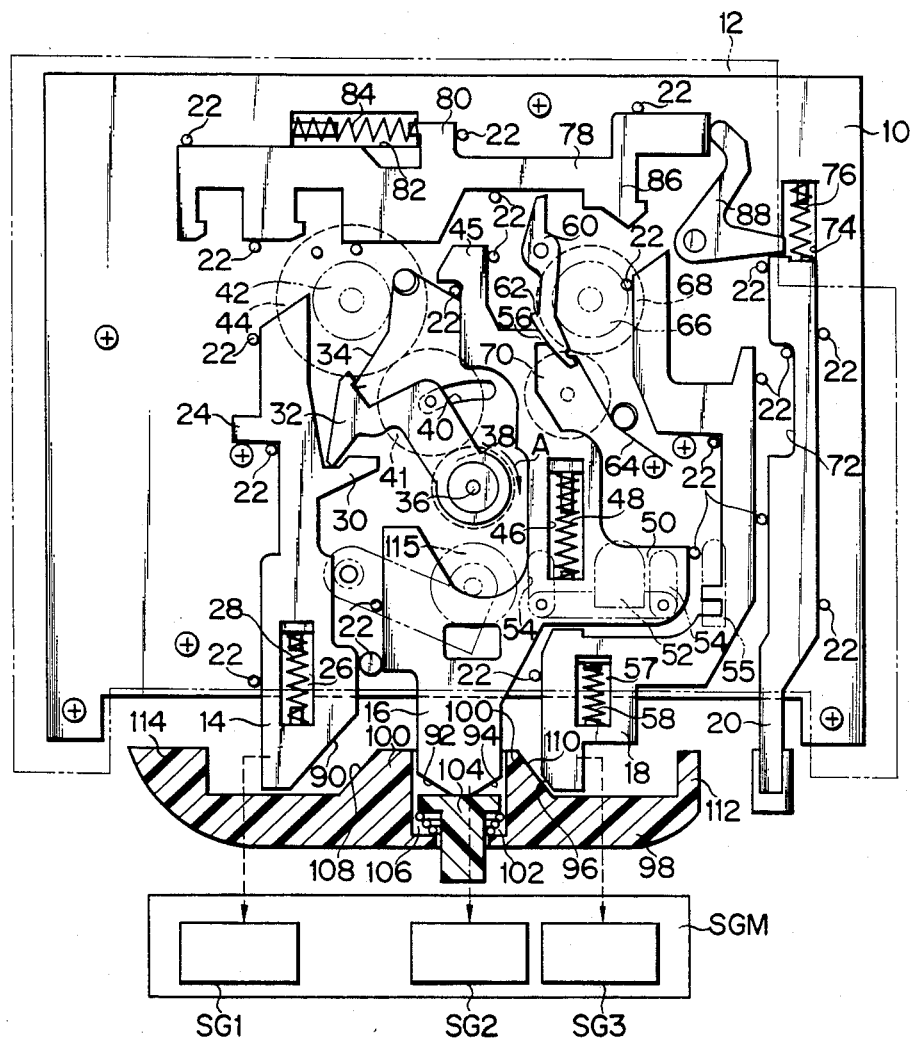
FIG. 2 is a plan view showing a state in which first to fourth operating levers of the operating lever apparatus according to the embodiment of the invention are located in their respective first positions so that the driving force of an electric motor to be transmitted to a capstan may be transmitted to a first reel shaft.

The operating lever apparatus 4 is provided with a flat first base plate 10 inside the housing of the electric appliance 6, as shown in FIG. 2. In front of the first base plate 10, as also shown in FIG. 2, a flat second base plate 12 is disposed parallel thereto at a given space therefrom.

Arranged between the first and second base plates 10 and 12 are flat first to fourth operating levers 14, 16, 18 and 20. As shown in FIG. 2, the first to fourth operating levers 14, 16, 18 and 20 are vertically elongated and substantially parallel to one another. The respective lower ends of the first to fourth operating levers 14, 16, 18 and 20 project downward from the lower edges of the first and second base plates 10 and 12.

A plurality of guide projections 22 are formed on the front of the first base plate 10. As shown in FIG. 2, some of the guide projections 22 are in contact with the vertically extending edges of the first to fourth operating levers 14, 16, 18 and 20. Having their vertical edges in slide contact with the guide projections 22, the first to fourth operating levers 14, 16, 18 and 20 are allowed to move only in the vertical direction.

A movement regulating member 24 projected leftwards is formed on the left-hand side face of the first operating lever 14, that is, "another" operating lever of this invention. As shown in FIG. 2, the lower end face of the movement regulating member 24 is in contact with one of the guide projections 22. The position of the first operating lever 14 in this state is defined as its first position. A vertically extending slot 26 is formed in the first operating lever 14. That region of the first base plate 10 which faces the slot 26 is notched to form an indentation having substantially the same shape and size as the slot 26. An urging means 28 is fitted in the slot 26. In this embodiment, the urging means 28 is formed of a compression coil spring, the upper end of which abuts on the upper edge of the indentation of the first base plate 10, and the lower end of which abuts on the lower edge of the slot 26 of the first operating lever 14. The urging means 28 urges the first operating lever 14 to be located in its first position. The diameter of the urging means 28 is only a little greater than the sum of the thicknesses of the first and second base plates 10 and 12 and the thickness of the first operating lever 14. Therefore, the urging means 28 projects only slightly from the back of the first base plate 10 into the outside space.

A operating arm portion 30 projected in the rightward direction is formed on the right-hand side face of the first operating lever 14 substantially halfway between the upper and lower ends thereof.

As shown in FIG. 2, a first rotating lever 32 is disposed between the right-hand side face of the first operating lever 14 and the left-hand side face of the second operating lever 16, as well as between the first and second base plates 10 and 12. One end of the first rotating lever 32 is pivotally mounted on the front of the first base plate 10 at a point below the operating arm portion 30 of the first operating lever 14, and the other end is in contact with the upper end face of the operating arm portion 30. The position of the first rotating lever 32 in this state is defined as its first position. As shown in FIG. 2, the first rotating lever 32 is urged to be located in its first position by an urging means 34 disposed between the first and second base plates 10 and 12. In this embodiment, the urging means 34 is formed of a torsion coil spring. The dimension of the torsion coil spring along the thickness of the operating lever apparatus is smaller than that of the compression coil spring.

At the center of rotation of the first rotating lever 32, as shown in FIG. 2, a capstan 36 is rotatably attached to the first base plate 10. The capstan 36 is rotated by an electric motor (not shown). A first gear 38 is concentrically fixed to the capstan 36 at the back of the first base plate 10. A backwardly projected shaft is fixed substantially to the middle portion of the first rotating lever 32. This shaft is passed through a slot 40 in the first base plate 10 which is in the shape of a circular arc described around the capstan 36. A second gear 41 in mesh with the first gear 38 is rotatably attached to the rear end of the shaft.

Between the upper end portion of the right-hand side face of the first operating lever 14 and the upper end portion of the left-hand side face of the second operating lever 16, as shown in FIG. 2, a first reel shaft 42 is rotatably mounted on the front of the first base plate 10. The front end of the first reel shaft 42 penetrates the second base plate 12 to be located ahead of the front of the second base plate 12. As shown in FIG. 2, a third gear 44 is fixed to the rear end of the first reel shaft 42 at the back of the first base plate 10. The third gear 44 is in mesh with the second gear 41.

A movement regulating member 45 projected leftwards is formed on the left-hand side face of the second operating lever 16, that is, on "one" operating lever of this invention. As shown in FIG. 2, the lower edge of the movement regulating member 45 is in contact with one of the guide projections 22. The position of the second operating lever 16 in this state is defined as its first position.

A vertically extending slot 46 is formed in the second operating lever 16. That region of the first base plate 10 which faces the slot 46 is notched to form an indentation having substantially the same shape and size as the slot 46. An urging means 48 is fitted in the slot 46 of the second operating lever 16. In this embodiment, the urging means 48 is formed of a compression coil spring, the upper end of which abuts on the upper edge of the indentation of the first base plate 10, and the lower end of which abuts on the lower edge of the slot 46 of the second operating lever 16. The urging means 48 urges the second operating lever 16 to be located in its first position. The diameter of the urging means 48 is only a little greater than the sum of the thicknesses of the first and second base plates 10 and 12 and the thickness of the second operating lever 16. Therefore, the urging means 48 projects only slightly from the back of the first base plate 10 into the outside space.

A support portion 50 extended rightwards is formed on the right-hand side face of the second operating lever 16. A magnetic head 52 is disposed in front of that region of the second base plate 12 which faces the front of the support portion 50, as shown in FIG. 2. The magnetic head 52 is fixed on the front of the support portion 50 of the second operating lever 16 by means of legs (not shown) which are passed through vertically extending slots 54 in the second base plate 12.

Above the support portion 50, a small engaging projection 56 protrudes from the right-hand side face of the second operating lever 16 to the right.

As shown in FIG. 2, the third operating lever 18, as "another" operating lever of this invention, is in the shape of a crank projecting rightwards. The support portion 50 of the second operating lever 16 is located at the lower end region of a hollow of the third operating lever 18. The lower end face of an upper horizontally extending portion of the third operating lever 18 is in contact with one of the guide projections 22. The position of the third operating lever 18 in this state is defined as its first position. The upper end face of a lower horizontally extending portion of the third operating lever 18 is in contact with the lower end face of the support portion 50 of the second operating lever 16. An erasing head 55 is disposed in front of the second base plate 12 at the right of the magnetic head 52. The erasing head 55 is fixed on the front of the third operating lever 18 by means of a leg (not shown) passed through a vertically extending slot (not shown) in the second base plate 12.

A vertically extending slot 57 is formed in the third operating lever 18. That region of the first base plate 10 which faces the slot 57 is notched to form an indentation having substantially the same shape and size of the slot 57. An urging means 58 is fitted in the slot 57. In this embodiment, the urging means 58 is formed of a compression coil spring, the upper end of which abuts on the upper end face of the indentation of the first base plate 10, and the lower end of which abuts on the lower end face of the slot 57 of the third operating lever 18. The urging means 58 urges the third operating lever 18 to be located in its first position.

As shown in FIG. 2, a holding means 60 formed of a vertically extending lever is disposed between the upper end portion of the right-hand side face of the second operating lever 16 and the upper end portion of the left-hand side face of the third operating lever 18. Located also between the first and second base plates 10 and 12, the holding means 60 is pivotally mounted at the middle on the front of the first base plate 10 so as to be able to rotate along the front of the first base plate 10. The upper end of the holding means 60, as shown in FIG. 2, is located above the upper end face of the second operating lever 16. The lower end portion of the left-hand side face of the holding means 60 is in contact with the right-hand side face of a small engaging projection 56 projecting rightwards from the right side face of the second operating lever 16. An engaged depression 62 is formed in the left-hand side face of the holding means 60 over the contact point between the rotating center of the holding means 60 and the small engaging projection 56. The position of the holding means 60 in this state is defined as its first position. As shown in FIG. 2, the holding means 60 is urged to be located in its first position by an urging means 64 disposed between the first and second base plates 10 and 12. In this embodiment, the urging means 64 is formed of a torsion coil spring. The dimension of the torsion coil spring along the thickness of the operating lever apparatus is smaller than that of the compression coil spring.

Between the holding means 60 and the upper end portion of the left-hand side of the third operating lever 18, as shown in FIG. 2, a second reel shaft 66 is rotatably mounted on the front of the first base plate 10. The front end of the second reel shaft 66 penetrates the second base plate 12 to be located ahead of the front of the second base plate 12. As shown in FIG. 2, a fourth gear 68 is concentrically fixed to the rear end of the second reel shaft 66 at the back of the first base plate 10. Under the fourth gear 68 on the second reel shaft 66, a fifth gear 70 is rotatably attached to the back of the first base plate 10. The fifth gear 70 is in mesh with the fourth gear 68. The fifth gear 70 is located within the locus of movement of the second gear 41 which moves as the rotating lever 32 rotates in the clockwise direction.

As shown in FIG. 2, a vertically extending indentation 72 is formed in the left-hand side face of the fourth operating lever 20. The upper end face of the indentation 72 is in contact with one of the guide projections 22. The position of the fourth operating lever 20 in this state is defined as its first position. Formed in the first base plate 10 is a slot 74 extending upward from that region of the first base plate 10 which faces the upper end face of the fourth operating lever 20. That region of the second base plate 12 which faces the slot 74 is notched, as shown in FIG. 2.

As shown in FIG. 2, an urging means 76 is disposed in the slot 74. In this embodiment, the urging means 76 is formed of a compression coil spring, one end of which abuts on the upper end face of the slot 74 of the first base plate 10, and the other end of which abuts on the upper end face of the fourth operating lever 20. The urging means 76 urges the fourth operating lever 20 into its first position. The diameter of the urging means 76 is only a little greater than the sum of the thicknesses of the first and second base plates 10 and 12 and the thickness of the fourth operating lever 20. Therefore, the urging means 76 projects only slightly from the back of the first base plate 10 into the outside space.

Between the first and second base plates 10 and 12, as shown in FIG. 2, a flat auxiliary operating lever 78 lies over the respective upper end faces of the first to third operating levers 14, 16 and 18 and one end of the holding means 60. The auxiliary operating lever 78 has an elongate shape extending horizontally.

As shown in FIG. 2, some of the guide projections 22 are in contact with the horizontally extending edges of the auxiliary operating lever 78. Having its edges in slide contact with the guide projections 22, the auxiliary operating lever 78 is allowed to move only in the horizontal direction.

As shown in FIG. 2, an upwardly projected portion 80 is formed on the upper edge of the auxiliary operating lever 78. The right-hand side face of the upwardly projected portion 80 is in contact with one of the guide projections 22. The position of the auxiliary operating lever 78 in this state is defined as its first position. Formed in the first base plate 10 is a slot 82 which extends to the left from that region of the first base plate 10 which faces the left-hand side face of the upwardly projected portion 80. That region of the second base plate 12 which faces the slot 82 is notched to form an indentation having substantially the same shape and size as the slot 82. An urging means 84 is disposed in the slot 82. In this embodiment, the urging means 84 is formed of a compression coil spring, one end of which abuts on the left-hand end face of the slot 82 of the first base plate 10, and the other end of which abuts on the left-hand side face of the upwardly projected portion 80 of the auxiliary operating lever 78. The urging means 84 urges the auxiliary operating lever 78 into its first position. The diameter of the urging means 84 is only a little greater than the sum of the thicknesses of the first and second base plates 10 and 12 and the thickness of the auxiliary operating lever 78. Therefore, the urging means 84 projects only slightly from the back of the first base plate 10 into the outside space.

Formed on the lower edge of the auxiliary operating lever 78, as shown in FIG. 2, is a hanging portion 86 which projects downward at the right of the upper end portion of the holding means 60. The left-hand side face of the hanging portion 86 faces the right-hand side face of the upper end portion of the holding means 60.

A substantially L-shaped second rotating lever 88 is disposed between the respective upper end portions of the third and fourth operating levers 18 and 20. The second rotating lever 88 is pivotally mounted at the middle on the front of the first base plate 10 so as to be able to rotate along the front of the first base plate 10. One end of the second rotating lever 88 abuts on the right-hand end face of the auxiliary operating lever 78, while the other end abuts on the upper end face of the fourth operating lever 20.

The first operating lever 14 is coupled with a first signal generator SG1. At the final stage of upward movement of the first operating lever 14 from its first position against the urging force of the urging means 28, the first signal generator SG1 produces a first electric signal, thereby rotating the motor in one direction at relatively high speed. The relatively fast rotation of the motor is transmitted to the capstan 36. The capstan 36 and the first gear 38 then rotate in the direction indicated by arrow A in FIG. 2 at relatively high speed.

The second operating lever 16 is coupled with a second signal generator SG2. At the final stage of upward movement of the second operating lever 16 from its first position against the urging force of the urging means 48, the second signal generator SG2 produces a second electric signal, thereby rotating the motor in one direction at relatively low speed. The relatively slow rotation of the motor is transmitted to the capstan 36. The capstan 36 and the first gear 38 then rotate in the direction indicated by arrow A at relatively low speed. At the same time, the second signal generator SG2 causes the magnetic head 52 to function as a reproducing head.

The third operating lever 18 is coupled with a third signal generator SG3. At the final stage of upward movement of the third operating lever 18 from its first position against the urging force of the urging means 58, the third signal generator SG3 produces a third electric signal, thereby causing the magnetic head 52 to function as a recording head.

In this embodiment, the first to third signal generators SG1, SG2 and SG3 constitute signal generating means SGM of this invention. As shown in FIG. 2, the intersectional region between the lower end face and right-hand side face of the first operating lever as "another" operating lever of this invention is cut aslant to form a first slant face 90.

The intersectional regions between the lower end face and the left-hand and right-hand side faces of the second operating lever 16 as "one" operating lever of this invention are cut aslant to form second and third slant faces 92 and 94 respectively, which are arranged in a substantially V-shaped configuration.

The intersectional region between the lower end face and left-hand side face of the third operating lever 18 as "another" operating lever of this invention is cut aslant to form a fourth slant face 96.

Under the respective lower end faces of the first to third operating levers 14, 16 and 18 lies a driving member 98 which extends in the direction to intersect the moving direction of the first to third operating levers 14, 16 and 18. The driving member 98 constitutes driving means of this invention. In this embodiment, the driving member 98 extends along the lower edges of the first and second base plates 10 and 12; that is, in the horizontal direction of FIG. 2. Further, the driving member 98 is movably mounted on the housing of the electric appliance 6 shown in FIG. 1, and can move along the lower edges of the first and second base plates 10 and 12 in a horizontal direction.

An upwardly projected boss portion 100 is formed at the middle of the upper end face of the driving member 98. The boss portion 100 constitutes the auxiliary driving means of this invention. Formed in the boss portion 100 is a vertically extending guide bore 102 which constitutes guide means. An inward flange is formed at the lower end of the guide bore 102. The lower end portion of the second operating lever 16 is inserted in the guide bore 102, and the left-hand and right-hand side regions of the inner surfaces of the driving member 98 and the boss portion 100, which define the guide bore 102, can be brought into slide contact with the respective left-hand and right-hand side faces of the second operating lever 16. Inside the guide bore 102, a push-button member 104 is disposed under the lower end of the second operating lever 16. The push-button member 104 has an outward flange which faces the inner surface of the inward flange of the guide bore 102. The lower end of the push-button member 104 penetrates a center hole of the driving member 98 defined by the inward flange of the guide bore 102, projecting downward from the lower end face of the driving member 98 into the outside space, as shown in FIG. 2. An urging means 106 is interposed between the inward flange of the guide bore 102 and the outward flange of the push-button member 104. The urging force of the urging means 106 is smaller than that of the urging means 48 of the second operating lever 16. In this embodiment, the urging means 106 is formed of a compression coil spring. The urging means 106 urges the push-button member 104 upward to cause the upper end face of the push-button member 104 to abut on the lower end face of the second operating lever 16. As shown in FIG. 2, the left-hand side face of the boss portion 100 is located on the right of the first slant face 90 of the first operating lever 14, facing the first slant face 90 at a given distance. The left-hand side face of the boss portion 100 is inclined substantially parallel to the first slant face 90 to form a first slide contact surface 108. The right-hand side face of the boss portion 100 is inclined substantially parallel to the fourth slant face 96 of the third operating lever 18 to form a second slide contact surface 110. The second slide contact surface 110 and the fourth slant face 96 of the third operating lever 18 face each other with a narrow space between them.

The right-hand side face of the driving member 98 is located between the respective lower end portions of the third and fourth operating levers 18 and 20. An upwardly projected first movement regulating member 112 is formed on the right-hand end portion of the upper end face of the driving member 98, as shown in FIG. 2. The left-hand side face of the first movement regulating member 112 faces the lower end portion of the right-hand side face of the third operating lever 18 at a given distance therefrom. Likewise, an upwardly projected second movement regulating member 114 is formed on the left-hand end portion of the upper end face of the driving member 98, as shown in FIG. 2. The right-hand side face of the second movement regulating member 114 faces the lower end portion of the left-hand side face of the first operating lever 14 at a given distance therefrom.

As shown in FIG. 2, a pinch roller 115 is disposed on the front of the second base plate 12. The pinch roller 115 is coupled with the second operating lever 16. When the second operating lever 16 is in its first position, the pinch roller 115 is off the capstan 36.

In the operating lever apparatus according to the preferred embodiment of this invention constructed in the manner described above, all the components except the first to fifth gears 38, 41, 44, 68 and 70, first and second reel shafts 42 and 66, capstan 36, magnetic head 52, erasing head 55, and driving member 98 are located between the front face of the second base plate 12 and the rear face of the first base plate 10. Thus, the tape recorder can be miniaturized with improved efficiency.

The operation of the operating lever apparatus according to this embodiment will now be described.

As shown in FIG. 3, the first and second reel shafts 42 and 66 are respectively fitted with first and second reel hubs 118 and 120 of the micro cassette 8. In this state, the capstan 36 is in contact with the back of a magnetic recording tape 122 in the micro cassette 8 between the first and second reel hubs 118 and 120.

If the push-button member 104 is pressed upward, then the second operating lever 16 moves upward from its first position against the urging force of the urging means 48, guided in the moving direction by the guide bore 102 constituting the guide means. As the second operating lever 16 moves upward, the right-hand side face of the small engaging projection 56 of the second operating lever 16 comes into slide contact with the lower end portion of the left-hand side face of the holding means 60. When the lower end face of the push-button member 104 becomes flush with the lower end face of the driving member 98, the small engaging projection 56 of the second operating lever 16 engages the engaged depression 62 of the holding means 60, as shown in FIG. 3. The position of the second operating lever 16 in this state is defined as its stand-by position. As the second operating lever 16 is urged downward by the urging force of the urging means 48, and as the holding means 60 is brought into contact with the right-hand side face of the second operating lever 16 by the urging force of the urging means 64, the small engaging projection 56 is kept engaged with the engaged depression 62, and the second operating lever 16 is held in its stand-by position. In the stand-by position, the magnetic head 52 is located right under the surface of the magnetic recording tape 122 in the tape cassette 8 at a narrow distance therefrom. As for the pinch roller 115, it is moved by the second operating lever 16 right under the capstan 36 at a narrow distance from the surface of the tape 122, as shown in FIG. 3. In the stand-by position, moreover, the second and third slant faces 92 and 94 of the second operating lever 16 face the intersectional lines between the upper end face of the boss portion 100 of the driving member 98 and the left-hand and right-hand side portions of the inner surface defining the guide bore 102, that is, one end edge of the guide bore 102, as shown in FIG. 3.

Figure 4:
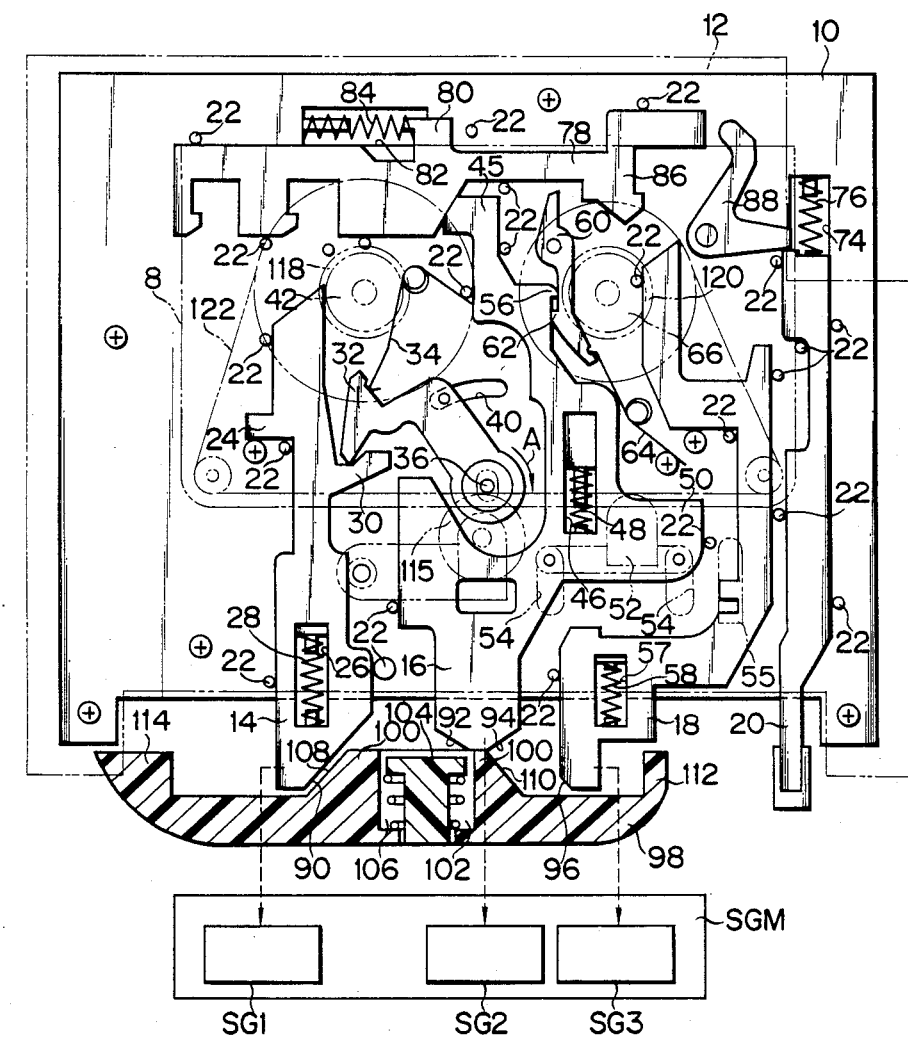
FIG. 4 is a plan view showing a state in which the pair of reel shafts of the operating lever apparatus of FIG. 2 are fitted with the pair of reel hubs of the tape cassette, and in which the second operating lever is located in its second position.

Then, the driving member 98 is moved to the left of FIG. 3. The leftward movement of the driving member 98 is stopped when the first slide contact surface 108 of the driving member 98 is brought into contact with the first slant face 90 of the first operating lever 14, as shown in FIG. 4. At this time, the third slant face 94 of the second operating lever 16 comes into slide contact with the intersectional line between the upper end face 45 of the boss portion 100 and the right-hand side portion of the inner surface defining the guide bore 102, thereby causing the second operating lever 16 to move slightly upward from its stand-by position shown in FIG. 3 against the urging force of the urging means 48. When the first slide contact surface 108 of the driving member 98 comes into contact with the first slant face 90 of the first operating lever 14, the lower end face of the second operating lever 16 abuts on the upper end face of the boss portion 100 of the driving member 98, as shown in FIG. 4. Thereupon, the slight upward movement of the second operating lever 16 from its stand-by position stops. Moreover, at this time, the magnetic head 52 abuts on the surface of the magnetic recording tape 122 in the tape cassette 8, and the pinch roller 115 holds the tape 122 in cooperation with the capstan 36, as shown in FIG. 4. At the same time, furthermore, the second operating lever 16 causes the second signal generator SG2 to produce the second electric signal. Accordingly, the magnetic recording tape 122 is driven by the capstan 36 to run from the second reel hub 120 toward the first reel hub 118 at relatively low speed. The magnetic head 52 functions as the reproducing head to reproduce information previously recorded on the tape 122. Thus, a playback mode is established in the tape recorder as the electric appliance 6 which is provided with the operating lever apparatus of this embodiment. This means that the second operating lever 16 serves as a reproducing or playback lever in the tape recorder. The position of the second operating lever 16 in this state is defined as its second position.

When the tape recorder is in the playback mode, as shown in FIG. 4, the driving member 98 is further moved to the left of FIG. 4 against the frictional force between the first slant face 90 of the first operating lever 14 and the first slide contact surface 108 of the driving member 98. The first slant face 90 of the first operating lever 14 then comes into slide contact with the first slide contact surface 108 of the driving member 98, thereby causing the first operating lever 14 to move upward from its first position shown in FIG. 4 against the urging force of the urging means 28.

Figure 5:
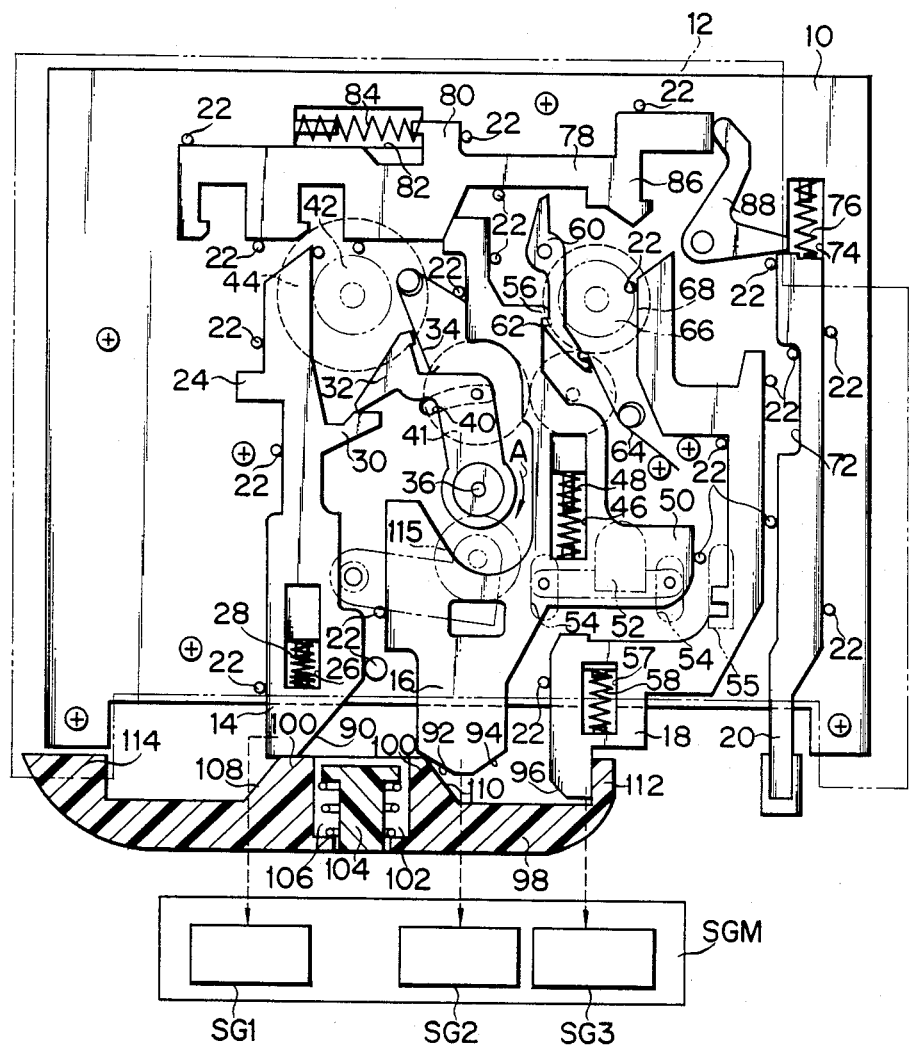
FIG. 5 is a plan view showing a state in which the first operating lever as another operating lever of the invention to function as a rewinding lever is located in its second position so that the driving force of the motor transmitted to the capstan may be transmitted to the second reel shaft.

The leftward movement of the driving member 98 is stopped when the left-hand side face of the first movement regulating member 112 of the driving member 98 abuts on the lower end portion of the right-hand side face of the third operating lever 18, as shown in FIG. 5. Thereupon, the lower end face of the first operating lever 14 is in contact with the upper end face of the boss portion 100 of the driving member 98, as shown in FIG. 5. The position of the first operating lever 14 in this state is defined as its second position. When the first operating lever 14 is located in its second position, the first rotating lever 32 rotates clockwise against the urging force of the urging means 34 to separate the second gear 41 from the third gear 44 and to bring the second gear 41 in mesh with the fifth gear 70, as shown in FIG. 5. When the first operating lever 14 is in its second position, moreover, the lower end face of the second operating lever 16 is located over the second slide contact surface 110 of the driving member 98 Released from the contact with the upper end face of the driving member 98, the second operating lever 16 is moved downward from its second position shown in FIG. 4 by the urging force of the urging means 48. The downward movement of the second operating lever 16 is stopped when the small engaging projection 56 engages the engaged depression 62 of the holding means 60, that is, when the second operating lever 16 is located in its stand-by position just before its second position, as shown in FIG. 5.

The first operating lever 14 in its second position causes the first signal generator SG1 to produce the first electric signal. Accordingly, the magnetic recording tape 122 is driven by the second reel shaft 66 to run from the first reel hub 118 toward the second reel hub 120 at relatively high speed. Thus, a rewinding mode is established in the tape recorder as the electric appliance 6 which is provided with the operating lever apparatus 4 of this embodiment. This means that the first operating lever 14 serves as a rewinding lever in the tape recorder.

Figure 6:
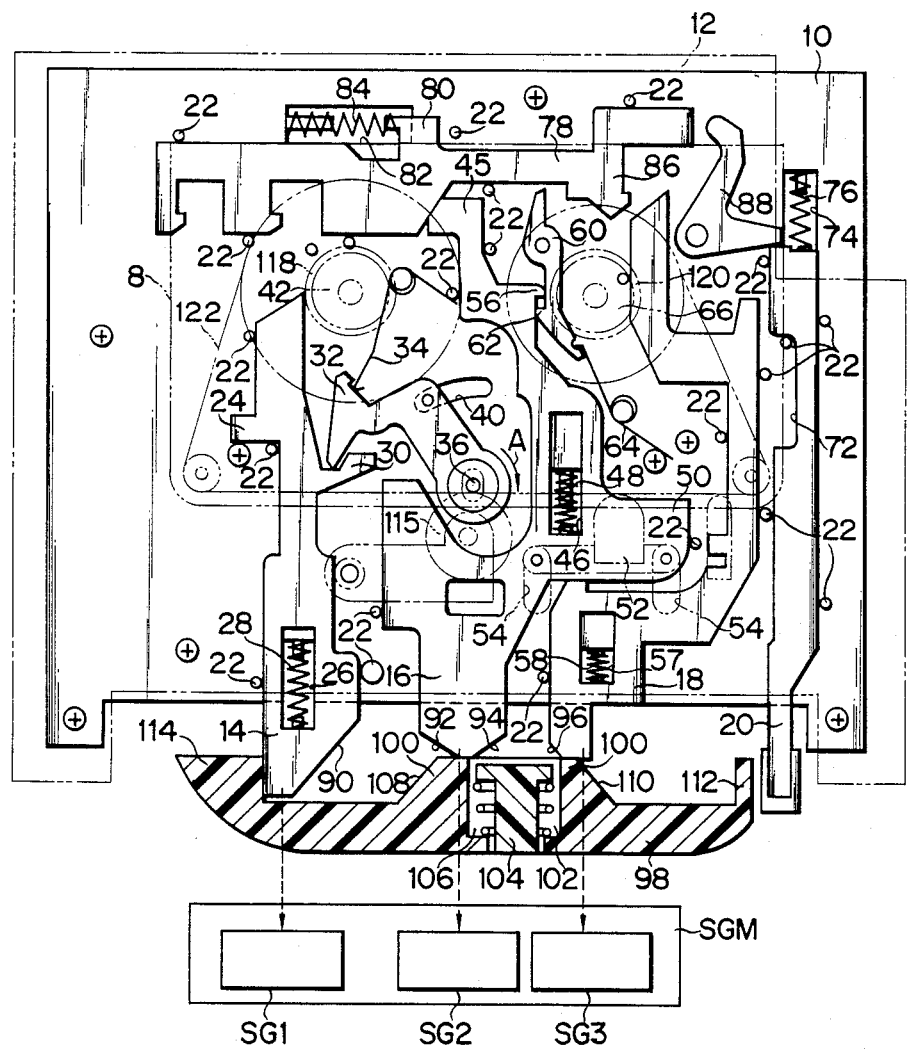
FIG. 6 is a plan view showing a state in which the pair of reel shafts of the operating lever apparatus of FIG. 2 are fitted with the pair of reel hubs of the tape cassette, and in which the third operating lever as still another operating lever of the invention to function as a recording lever is located in its second position.

Subsequently, when the second operating lever 14 is in its stand-by position, as shown in FIG. 3, the driving member 98 is moved to the right. The rightward movement of the driving member 98 is stopped when the right-hand side face of the second movement regulating member 114 of the driving member 98 is brought into contact with the lower end portion of the left-hand side face of the first operating lever 14, as shown in FIG. 6. Thereupon, the fourth slant face 96 of the second operating lever 16 comes into slide contact with the intersectional line between the upper end face of the boss portion 100 of the driving member 98 and the left-hand side portion of the inner surface defining the guide bore 102, thereby causing the second operating lever 16 to move slightly upward from its stand-by position shown in FIG. 3 against the urging force of the urging means 48. When the right-hand side face of the second movement regulating member 114 of the driving member 98 is brought into contact with the lower end portion of the left-hand side face of the first operating lever 14, the lower end face of the second operating lever 16 abuts on the upper end face of the boss portion 100 of the driving member 98, as shown in FIG. 4. The slight upward movement of the second operating lever 16 from its stand-by position is then stopped, and the second operating lever 16 is located in its second position.

The rightward movement of the driving member 98 causes the fourth slant face 96 of the third operating lever 18 to slide on the second slide contact surface of the driving member 98, thereby causing the third operating lever 18 to move upward from its first position shown in FIG. 3 against the urging force of the urging means 58. When the driving member 98 ceases to move to the right, the lower end face of the third operating lever 18 abuts on the upper end face of the boss portion 100 of the driving member 98, as shown in FIG. 6, to stop the upward movement of the third operating lever 18. The position of the third operating lever 18 is defined as its second position. When the third operating lever 18 is located in its second position, the erasing head 55 is brought into contact with the surface of the magnetic recording tape 122. The third operating lever 18 in its second position, moreover, causes the third signal generator SG3 to produce the third electric signal. Accordingly, the magnetic recording tape 122 is driven by the capstan 36 to run from the second reel hub 120 toward the first reel hub 118 at relatively low fixed speed. Further, the magnetic head 52 functions as the recording head to record sound on the tape 122. Thus, a recording mode is established in the tape recorder as the electric appliance 6 which is provided with the operating lever apparatus 4 of this embodiment. This means that the third operating lever 18 serves as a recording lever in the tape recorder.

Subsequently, when the second operating lever 14 is in its stand-by position, as shown in FIG. 3, the fourth operating lever 20 is moved upward from its first position shown in FIG. 3 against the urging force of the urging means 76. Then, the second rotating lever 88 rotates to cause the auxiliary operating lever 78 to move from its first position to the left against the urging force of the urging means 84, as shown in FIG. 7. The left-hand side face of the hanging portion 86 of the auxiliary operating lever 78, thus moved to the left, abuts on the upper end portion of the right-hand side face of the holding means 60, as shown in FIG. 7, to cause the holding means 60 to rotate counterclockwise against the urging force of the urging means 64. The position of the fourth operating lever 20 in this state is defined as its second position. Thereupon, the engaged depression 62 of the holding means 60 is disengaged from the small engaging projection 56 of the second operating lever 16, and the second operating lever 16 is moved downward by the urging force of the urging means 48, which is greater than that of the urging means 106 of the push-button member 104, to be located in its first position shown in FIG. 2. This means that the fourth operating lever 20 serves as a stop lever.

Although an illustrative embodiment of this invention has been described in detail herein, it is to be understood that the invention is not limited to this embodiment, and that various changes and modifications may be effected therein by one skilled in the art without departing from the scope or spirit of the invention.

What is claimed is:

1. An operating lever apparatus comprising:
an operating lever being movable between first and second positions;
holding means for holding said operating lever in a position just before said second position; and
a driving member being movable between first and second positions in a direction to intersect the moving direction of said operating lever, said driving member having guide means for guiding said operating lever in movement from said first position to said position just before said second position when the driving member is located in its first position, said driving member moving in the direction to intersect the moving direction of said operating lever to shift said operating lever from said position just before said second position to said second position when said operating lever is located in said position just before said second position;
said guide means of said driving member having a guide bore extending along the direction of the movement of said operating lever between said first and second positions thereof, said guide bore having at least one end edge; and
said operating lever having urging means for urging said operating lever to be located in said first position thereof, and one end portion which, extending along the direction of the movement of said operating lever between said first and second positions thereof, is inserted in said guide bore of said driving member when said driving member is located in its said first position, said one end portion having an end face and a slant face at an intersectional region between said end face of said one end portion and a side face extending along the moving direction of said operating lever to intersect the moving direction of said driving member, said slant face facing one end edge of said guide bore of said driving member when said operating lever is located in said position just before said second position;
whereby when said operating lever is located in said position just before said second position, said driving member is moved from said first position to said second position to bring said slant face of said operating lever into slide contact with said one end edge of said guide bore of said driving member, thereby shifting said operating lever from said position just before said second position to said second position thereof.

2. An operating lever apparatus according to claim 1, further comprising another operating lever being movable between first and second positions, wherein said driving member can move to to a third position as well as to said first and second positions, and includes auxiliary driving means for shifting said another operating lever from said first position to said second position thereof as said driving member moves to said third position thereof.

3. An operating lever apparatus according to claim 2, wherein the moving direction of said another operating lever is substantially parallel to the moving direction of said first operating lever;

said another operating lever has one end portion located in the vicinity of said driving member; and
said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

4. An operating lever apparatus according to claim 3, further comprising urging means for urging said another operating lever into said first position thereof.

5. An operating lever apparatus according to claim 1, further comprising a push-button member disposed in said guide bore so as to be able to move along the moving direction of said operating lever, and having one end capable of coming into contact with said end face of said one end portion of said operating lever when said operating lever is located in said first position, and another end projected from said driving member into the outside space when said operating lever is located in said first position.

6. An operating lever apparatus according to claim 5, further comprising:
first and second spaced apart base plates, said first base plate being parallel to said second base plate, said operating lever being disposed between said first and second base plates so as to be movable along said base plate; and
another operating lever disposed between said first and second base plates so as to be movable along the first and second base plates between first and second positions;
said driving member being movable to a third position as well as to said first and second positions, and said driving member including auxiliary driving means for shifting said another operating lever from said first position to said second position thereof as said driving member moves to said third position thereof.

7. An operating lever apparatus according to claim 6, wherein the moving direction of said another operating lever is substantially parallel to the moving direction of said first operating lever;
said another operating lever has one end portion located in the vicinity of said driving member; and
said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

8. An operating lever apparatus according to claim 7, further comprising urging means for urging said another operating lever into said first position thereof.

9. An operating lever apparatus according to claim 5, further comprising urging means disposed in said guide bore, whereby said one end of said push-button member is pressed against said end face of said one end portion of said operating lever in said first position with a force smaller than the urging force of the urging means of said operating lever to urge said operating lever to be moved toward said second position.

10. An operating lever apparatus according to claim 9, further comprising:
first and second spaced apart base plates, said first base plate being parallel to said second base plate, said operating lever being disposed between said first and second base plates so as to be movable along said base plates; and
another operating lever disposed between said first and second base plates so as to be movable along the first and second base plates between first and second positions;
said driving member being movable to a third position as well as to said first and second positions, and said driving member including auxiliary driving means for shifting said another operating lever from said first position to said second position thereof as said driving member moves to said third position thereof.

11. An operating lever apparatus according to claim 10, wherein the moving direction of said another operating lever is substantially parallel to the moving direction of said first operating lever;
said another operating lever has one end portion located in the vicinity of said driving member; and
said auxiliary driving member of said driving member has a slant face formed on said driving member and facing said one end portion of said another operating lever in said first position thereof as said driving member is located in said first or second position thereof, so that said slant face may he brought into slide contact with said one end portion of said another operating lever to shift said another operating lever from said first position to said second position thereof as said driving member moves to said third position thereof.

12. An operating lever apparatus according to claim 11, further comprising urging means for urging said another operating lever into said first position thereof.

13. An operating lever apparatus for use in an electric appliance, comprising:
a first base plate;
a second base plate disposed parallel to said first base plate at a given distance therefrom;
an operating lever disposed between said first and second base plates so as to be able to move along the first and second base plates between first and second positions;
holding means for holding said operating lever in a positon just before said second position; and
a driving member arranged so as to be movable along said first and second base plates between first and second positions in a direction to intersect the moving direction of said operation lever, said driving member having guide means for guiding said operating lever in movement from said first position to said position just before said second position when the driving member is located in its first position, said driving member moving in the direction to intersect the moving direction of said operating lever to shift said operating lever from said position just before said second position to said second position when said operating lever is located in said position just before said second position.

14. An operating lever apparatus according to claim 13, wherein said guide means of said driving member has a guide bore extending along the direction of the movement of said operating lever between said first and second posotions thereof, said guide bore having at least one end edge; and said operating lever has urging means for urging said operating lever to be located in said first position thereof, and one end portion which, extending along the direction of the movement of said operating lever between said first and second positions thereof, is inserted in said guide bore of said driving member when said driving member is located in its said first position, said one end portion having an end face and a slant face at an intersectional region between said end face of said one end portion and a side face extending along the moving direction of said operating lever to intersect the moving direction of said driving member, said slant face facing one end edge of said guide bore of said driving member when said operating lever is located in said position just before said second position;

whereby, when said operating lever is located in said position just before said second position, said driving member is moved from said first position to said second position to bring said slant face of said operating lever into slide contact with said one end edge of said guide bore of said driving member, thereby shifting said operating lever from said position just before said second position to said second position thereof.

15. An operating lever apparatus according to claim 14, further comprising another operating lever disposed between said first and second base plates so as to be movable along the first and second base plates between first and second positions, wherein said driving member is movable to a third position as well as to said first and second position and includes auxiliary driving means for shifting said another operating lever from said first position to said second position thereof as said driving member moves to said third position thereof.

16. An operating lever apparatus according to claim 15, wherein the moving direction of said another operating lever is substantially parallel to the moving direction of said first operating lever;

said another operating lever has one end portion located in the vicinity of said driving member; and said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

17. An operating lever apparatus according to claim 16, further comprising urging means for urging said another operating lever into said first position thereof.

18. An operating lever apparatus, according to claim 14, further comprising a push-button member disposed in said guide bore so as to be able to move along the moving direction of said operating lever, and having one end capable of coming into contact with said end face of said one end portion of said operating lever when said operating lever is located in said first position, and another end projected from said driving member into the outside space when said operating lever is located in said first position.

19. An operating lever apparatus according to claim 18, further comprising another operating lever disposed between said first and second base plates so as to be movable along the first and second base plates between first and second positions, wherein said driving member is movable to a third position as well as to said first and second positions, and includes auxiliary driving means for shifting said another operating lever from said first position to said second position thereof as said driving member moves to said third position thereof.

20. An operating lever apparatus according to claim 19, wherein the moving direction of said another operating lever is substantially parallel to the moving direction of said first operating lever;

said another operating lever has one end portion located in the vicinity of said driving member; and said auxiliary driving member of said driving member has a slant face formed on said driving member and facing said one end portion of said another operating lever in said first or second position thereof, so that said slant face may be brought into slide contact with said one end portion of said another operating lever to shift said another operating lever from said first position to said second position thereof as said driving member moves to said third position thereof.

21. An operating lever apparatus according to claim 20, further comprising urging means for urging said another operating lever into said first position thereof.

22. An operating lever apparatus according to claim 18, further comprising urging means disposed in said guide bore, whereby said one end of said push-button member is pressed against said end face of said end portion of said operating lever in said first position with a force smaller than the urging force of the urging means of said operating lever to urge said operating lever to be moved toward said second position.

23. An operating lever apparatus according to claim 22, further comprising another operating lever disposed between said first and second base plates so as to be movable along the first and second base plates between first and second positions, wherein said driving member is movable to a third position as well as to said first and second position and includes auxiliary driving means for shifting said another operating lever from said first position to said second position thereof as said driving member moves to said third position thereof.

24. An operating lever apparatus according to claim 23, wherein the moving direction of said another operating lever is substantially parallel to the moving direction of said first operating lever;

said another operating lever has one end portion located in the vicinity of said driving member; and said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

25. An operating lever apparatus according to claim 24, further comprising urging means for urging said another operating lever into said first position thereof.

26. An operating lever apparatus according to claim 13, wherein the apparatus operates in accordance with electric signals produced by a signal generating means, the signal generating means being caused to produce an electric signal when said operating lever is located in said second position.

27. An operating lever apparatus according to claim 26, wherein said guide means of said driving member has a guide bore extending along the direction of the movement of said operating lever between said first and second positions thereof, said guide bore having at least one end edge; and said operating lever has urging means for urging said operating lever to be located in said first position thereof, and one end portion which, extending along the direction of the movement of said operating lever between said first and second positions thereof, is inserted in said guide bore of said driving member when said driving member is located in its said first position, said one end portion having an end face and a slant face at an intersectional region between said end face of said one end portion and a side face extending along the moving direction of said operating lever to intersect the moving direction of said driving member, said slant face facing one end edge of said guide bore of said driving member when said operating lever is located in said position just before said second position;

whereby, when said operating lever is located in said position just before said second position, said driving member is moved from said first position to said second position to bring said slant face of said operating lever into slide contact with said one end edge of said guide bore of said driving member, thereby shifting said operating lever from said position just before said second position to said second position thereof.

28. An operating lever apparatus according to claim 27, further comprising another operating lever being movable between first and second positions, wherein said driving member can move to a third position as well as to said first and second positions, and includes auxiliary driving means for shifting said another operating lever from said first position to said second position thereof as said driving member moves to said third position thereof.

29. An operating lever apparatus according to claim 28 wherein the moving direction of said another operating lever is substantially parallel to the moving direction of said first operating lever;

said another operating lever has one end portion located in the vicinity of said driving member; and
said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

30. An operating lever apparatus according to claim 29 further comprising urging means for urging said another operating lever into said first position thereof.

31. An operating lever apparatus according to claim 27, further comprising a push-button member disposed in said guide bore so as to be able to move along the moving direction of said operating lever, and having one end capable of coming into contact with said end face of said one end portion of said operating lever when said operating lever is located in said first position, and another end projected from said driving member into the outside space when said operating lever is located in said first position.

32. An operating lever apparatus according to claim 31, further comprising another operating lever being movable between first and second positions, wherein said driving member can move to a third position as well as to said first and second positions, and includes auxiliary driving means for shifting said another operating lever from said first position to said second position thereof as said driving member moves to said third position thereof.

33. An operating lever apparatus according to claim 32 wherein the moving direction of said another operating lever is substantially parallel to the moving direction of said first operating lever, said another operating lever has one end portion located in the vicinity of said driving member; and
said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

34. An operating lever apparatus according to claim 33 further comprising urging means for urging said another operating lever into said first position thereof.

35. An operating lever apparatus according to claim 31 further comprising urging means disposed in said guide bore, whereby said one end of said push-button member is pressed against said end face of said one end portion of said operating lever in said first position with a force smaller than the urging force of the urging means of said operating lever to urge said operating lever to be moved toward said second position.

36. An operating lever apparatus according to claim 35, further comprising another operating lever being movable between first and second positions, wherein said driving member can move to a third position as well as to said first and second positions, and includes auxiliary driving means for shifting said another operating lever from said first position to said second position thereof as said driving member moves to said third position thereof.

37. An operating lever apparatus according to claim 36 wherein the moving direction of said another operating lever is substantially parallel to the moving direction of said first operating lever;

said another operating lever has one end portion located in the vicinity of said driving member; and
said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

38. An operating lever apparatus according to claim 37 wherein the moving direction of said another operating lever is substantially parallel to the moving direction of said first operating lever;

said another operating lever has one end portion located in the vicinity of said driving member; and said auxiliary driving member of said driving member has a slant face formed on said driving member and facing said one end portion of said another operating lever in said first position thereof as said driving member is located in said first or second position thereof, so that said slant face may be brought into slide contact with said one end portion of said another operating lever to shift said another operating lever from said first position to said second position thereof as said driving member moves to said third position thereof.

* * * * *

UNITED STATES PATENT AND TRADEMARK OFFICE
CERTIFICATE OF CORRECTION

PATENT NO. : 4,651,250

DATED : March 17, 1987

INVENTOR(S) : SAITOU

It is certified that error appears in the above-identified patent and that said Letters Patent is hereby corrected as shown below:

Title page, left-hand column, the Assignee identified as "Olympus Optical Ltd." should be -- Olympus Optical Co., Ltd. --.

Signed and Sealed this

Second Day of February, 1988

Attest:

DONALD J. QUIGG

*Attesting Officer*　　　　*Commissioner of Patents and Trademarks*